(12) United States Patent
Laubach et al.

(10) Patent No.: US 12,115,757 B2
(45) Date of Patent: Oct. 15, 2024

(54) MULTIFUNCTIONAL LAMINATES

(71) Applicant: DelStar Technologies, Inc., Middletown, DE (US)

(72) Inventors: Soenke Laubach, Hamburg (DE); David Collette, South Hadley, MA (US); Hugh Miller, New Berlin, WI (US)

(73) Assignee: DELSTAR TECHNOLOGIES, INC., Alpharetta, GA (US)

( * ) Notice: Subject to any disclaimer, the term of this patent is extended or adjusted under 35 U.S.C. 154(b) by 0 days.

(21) Appl. No.: 18/098,266

(22) Filed: Jan. 18, 2023

(65) Prior Publication Data

US 2023/0226806 A1     Jul. 20, 2023

Related U.S. Application Data

(60) Provisional application No. 63/300,591, filed on Jan. 18, 2022.

(51) Int. Cl.
*B32B 17/10* (2006.01)

(52) U.S. Cl.
CPC .... *B32B 17/10715* (2013.01); *B32B 17/1077* (2013.01); *B32B 2264/0221* (2013.01); *B32B 2264/0285* (2013.01); *B32B 2264/0292* (2013.01); *B32B 2310/0831* (2013.01)

(58) Field of Classification Search
None
See application file for complete search history.

(56) References Cited

U.S. PATENT DOCUMENTS

| | | | |
|---|---|---|---|
| 2018/0117881 A1* | 5/2018 | Pyles | B32B 7/12 |
| 2019/0067826 A1* | 2/2019 | Achour | H01Q 15/00 |
| 2019/0145161 A1* | 5/2019 | Agrawal | E06B 9/24 |
| | | | 359/275 |
| 2019/0255812 A1* | 8/2019 | Bard | B32B 17/10788 |
| 2019/0263227 A1* | 8/2019 | Noda | B32B 17/10779 |
| 2022/0372248 A1* | 11/2022 | Galica | C08K 5/3475 |

* cited by examiner

*Primary Examiner* — Anthony J Frost
(74) *Attorney, Agent, or Firm* — Farber LLC (57) ABSTRACT

The present disclosure relates to compositions, laminates, films and/or composites made from polymers, such as thermoplastic polyurethane ("TPU"). The films have one or more optical layers made from materials that allow the transmission of visible light and reflect or absorb UV light. A composite having an infrared ("IR") cutoff layer, and a polymer layer desirably having an ultraviolet ("UV") absorber is disposed between layers of glass or artificial glass, combined with polycarbonate ("PC") or polyethylene terephalate ("PET") layers.

37 Claims, 5 Drawing Sheets

MULTIFUNCTIONAL LAMINATES

CROSS-REFERENCE TO RELATED APPLICATIONS

This application claims the benefit of U.S. Provisional Application Ser. No. 63/300,591, filed Jan. 18, 2022, the complete disclosure of which is incorporated herein by reference in its entirety for all purposes.

BACKGROUND

The field of the present disclosure relates to compositions, composites, laminates and/or films having one or more optical materials or layers that block UV radiation while being substantially transparent to visible light.

Film and laminates having high optical transparency to visible light are desirable in a number of applications. For example, films having high optical transparency are used in vehicle windshields and sunroofs, food packaging, optical disk devices, residential and commercial windows and the like.

Solar radiation is radiant (electromagnetic) energy from the sun. It provides light and heat for the Earth and energy for photosynthesis. This radiant energy is necessary for the metabolism of the environment and its inhabitants. The solar radiation spectrum is divided into different radiation regions defined by the wavelength range. In general, human eyes are capable of sensing visible lights with wavelengths in the range of about 400 nm to 700 nm. Invisible light comprises infrared rays with wavelengths of about 700 nm to 1 m and ultraviolet ("UV") rays with wavelengths of about 10 nm to 400 nm.

The various radiation regions of the solar spectrum can impose different effects on the environment and humans. Although small amounts of UV light can be beneficial for humans, prolonged exposure to UV radiation can damage human skin and lead to acute and chronic health issues. Similarly, prolonged exposure to UV light can also damage or tarnish goods, such as upholstery and furniture.

Thus, while solar radiation brings natural lighting to a building or an automobile interior through windows, it also brings along unwanted effects from UV radiation. UV radiation causes direct harm and damage to objects in the interior of a space. As such, a functional window that transmits visible light but blocks UV light is essential for buildings and automobiles to reduce the electricity load and to protect all objects and users inside. For example, blocking UV and infrared radiation can reduce the need for air-conditioning in an automobile or other vehicle.

Laminated glass windows with polymeric interlayers are commonly employed for safety concerns and improved energy efficiency, with polyvinyl butyral ("PVB") resin sheets being the most common glass laminate. Conventional automotive or architectural glazing or window structures often include a laminate typically made of two rigid glass or plastic sheets and an interlayer of plasticized polyvinyl butyral ("PVB"). PVB sheets are commonly used because they can hold sharp glass fragments in place when the glass is broken. Thus, PVB laminated safety glass is widely applied in building and automobile windows, show cases, and other places where human interactions are highly involved. In addition to layered glass composites, artificial glass has certain benefits. For example, artical glass is more easily moldable in all three dimensions, making those composites good candidates for windshields and skylights in vehicles. Polycarbonate and other polymers can be used in forming these composites.

An optical filter is a device that selectively transmits and/or blocks light of different wavelengths. The optical properties filtered are completely described by their frequency response, which specifies how the magnitude and phase of each frequency component of an incoming signal is modified by the filter. Optical layers or filters can be disposed within, or between, PVB sheets to block UV light passing through the laminated window.

PVB layers, however, have certain drawbacks in laminates, such as glass windows. For example, a high level of moisture can wick into the PVB layers during use. This moisture can ultimately cause failure of the laminate or reduce the quality of visible light passing through the window. In addition, PVB generally has a high modulus and a low tensile strength, which can negatively impact the performance of the glazing in such applications as windows and automobile windshields. Moreover, PVB interlayers can bleed between the film layers at edges and cause enough separation to create highly colored iridescence called "edge brightening". Edge brightening is not a desirable characteristic in glass laminates of this type.

What is needed, therefore, are improved compositions and structures with optical layers, such as films, composites or laminates for vehicle and building windows, that are more durable and less susceptible to moisture penetration and/or bleeding, while still providing protection from the adverse effects of UV radiation and still being thin enough to support lower material costs in a competitive market.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The present disclosure relates to films, compositions, laminates and/or composites made from thermoplastic polymers, preferably thermoplastic polyurethane ("TPU"). The films have one or more optical materials and/or layers made from materials that allow the transmission of visible light and reflect or absorb UV light. In certain embodiments, the present disclosure relates to compositions made from one or more resins, at least one of which is an aliphatic thermoplastic polyurethane resin. In other embodiments, the present disclosure relates to glass composites, such as window glass, that include TPU and optical materials therein.

In an aspect, a composite comprising a first layer of glass, a second layer of glass, a layer of thermoplastic polyurethane ("TPU") between the first layer of glass and the second layer of glass, and a polyethylene terephthalate ("PET") film between the first layer of glass and the second layer of glass is disclosed. In the composite, the layer of TPU can be a resin composite. The layer of TPU can have an ultraviolet ("UV") absorber selected from the group consisting of the benzotriazole family or the triazin family.

In embodiments, the composite further comprises an infrared ("IR") cutoff layer between the layer of TPU and the PET film. The layer of TPU can have a UV absorber. The composite can have a low emissivity ("low-E") layer between the PET film and the second layer of glass.

In embodiments, the layer of TPU is a first layer of TPU and the composite further comprises a second layer of TPU between the PET film and the low-E layer. In embodiments, a third layer of TPU is between the low-E layer and the second layer of glass.

In embodiments, at least one of the first layer of TPU, the second layer of TPU, or the third layer of TPU is a resin composite having an UV absorber and a light stabilizer. In embodiments, at least one of the first layer of TPU, the second layer of TPU, or the third layer of TPU has more than one UV absorber.

The composite can further comprise transparent electromagnetic interference ("EMI") shielding in or on the IR cutoff layer. The composite can further comprise a transparent antenna in or on the IR cutoff layer.

In a further aspect, a composite has a first film of polycarbonate ("PC"), a second film of PC, at least one TPU layer between the first film of PC and the second film of PC, and a PC sheet between the first film of PC and the second film of PC.

In embodiments, the at least one TPU layer is a resin composite. The at least one TPU layer can have a UV absorber selected from the group consisting of the benzotriazole family or the triazin family.

In embodiments, the at least one TPU layer is a first TPU layer and the composite further comprises an infrared ("IR") cutoff layer between the first film of PC and the first TPU layer. The PC sheet can be between the first TPU layer and the second film of PC. The PC sheet can be a first PC sheet and the composite can further comprise a second TPU layer between the first PC sheet and the second film of PC. The second TPU layer can be between the first PC sheet and the second film of PC.

In embodiments, a second PC sheet is between the second TPU layer and the second film of PC. A third TPU layer can be between the second PC sheet and the second film of PC.

In embodiments, the composite further comprises a low-E layer between the third TPU layer and the second film of PC.

In embodiments, at least one of the first TPU layer, the second TPU layer, or the third TPU layer is a resin composite having a UV absorber and a light stabilizer. In embodiments, at least one of the first TPU layer, the second TPU layer, or the third TPU layer has more than one UV stabilizer.

In embodiments, the composite further comprises transparent EMI shielding in or on the IR cutoff layer. In embodiments, a transparent antenna is in or on the IR cutoff layer.

In another aspect, a composite having a first film of polycarbonate ("PC"), a transparent infrared ("IR") cutoff layer, a first film of a polymer selected from thermoplastic polyurethane ("TPU") or ethylene co-vinyl acetate ("EVA"), a first PC sheet, a second film of a polymer selected from TPU or EVA, a second PC sheet, a third film of a polymer selected from TPU or EVA, and a second film of PC is disclosed.

In embodiments, the composite further comprises a low-E layer between the third film of a polymer selected from TPU or EVA and the second film of PC. A top coat may be on at least one of the first film of PC and and the second film of PC.

At least one of the first film of a polymer selected from TPU or EVA, the second film a polymer selected from TPU or EVA, or the third film of a polymer selected from TPU or EVA may be a resin composite having a UV absorber and a light stabilizer.

In embodiments, the IR cutoff layer has transparent EMI shielding in or on the IR cutoff layer. The IR cutoff layer may have a transparent antenna in or on the IR cutoff layer.

In another aspect, a composite has a first layer of glass, a first layer of a polymer selected from TPU or EVA, an IR cutoff layer, a PET film, a second layer of a polymer selected from TPU or EVA, and a second layer of glass.

In embodiments, the composite can further comprise a low-E layer between the second layer of a polymer selected from TPU or EVA and the second layer of glass and further comprise a third layer of a polymer selected from TPU or EVA between the low-E layer and the second layer of glass.

At least one of the first layer of a polymer selected from TPU or EVA, the second layer of a polymer selected from TPU or EVA, or the third layer of a polymer selected from TPU or EVA can be a resin composite having a UV absorber and a light stabilizer.

In embodiments, the IR cutoff layer has transparent EMI shielding in or on the IR cutoff layer. In embodiments, the IR cutoff layer has an invisible antenna in or on the IR cutoff layer.

The TPU compositions disclosed herein are less susceptible to moisture wicking into the TPU layers, providing a more durable optical composition and improving the quality of visible light passing therethrough. TPU also has desirable properties that allow it to be etched into plastics. In addition, the TPU compositions of the present disclosure are less susceptible to bleeding between the film layers at edges, thereby reducing edge brightening.

The TPU layers disclosed herein are preferably selected from a material that provides sufficient transparency to visible light and exhibits suitable adhesion to glass, polycarbonate, acrylic, cellulose acetate butyrate, or other surfaces which the layers may contact. In certain embodiments, the TPU layers preferably have a storage modulus sufficient to substantially absorb and dissipate the kinetic energy of air particulates that contact its surface, such as rain, hail, wind, dirt and other contaminants. At the same time, the TPU material preferably has substantial tear and abrasion resistance, thereby protecting the film from adverse environmental conditions.

In one aspect, optical films made from aliphatic thermoplastic polyurethane resin compositions are provided. The resin compositions include an aliphatic thermoplastic polyurethane resin, a first UV absorber selected from the group consisting of the benzotriazole family or the triazin family, a light stabilizer, and a second UV absorber. The second UV absorber is preferably selected from a group consisting of benzotriazoles, benzophenones, triazin or benzylidene malonate.

In certain embodiments, the TPU resin is present in an amount from about 95% to about 99.99% by weight. The first UV absorber is present in the TPU resin in an amount from about 0.1% to about 1.0% by weight. The second US absorber is present from about 0.01% to about 2.0% by weight. In a preferred embodiment, the first and second UV absorbers are present in a combined amount of about 0.1% to about 3% by weight.

In certain embodiments, the second UV absorber is selected from the group consisting of benzotriazole-type absorbers or benzophenone-type absorbers.

In certain embodiments, the light stabilizer comprises an amine light stabilizer (HALS or NOR-HALS). In an exemplary embodiment, the light stabilizer may be produced by a mixing bis(1,2,2,6,6-pentamethyl-4-piperidyl)sebacate and methyl 1,2,2,6,6-pentamethyl-4-piperidyl sebacate. In embodiments, bis(1,2,2,6,6-pentamethyl-4-piperidyl)sebacate and methyl 1,2,2,6,6-pentamethyl-4-piperidyl sebacate are mixed in a 3:1 ratio.

In certain embodiments, the second UV absorber is combined with the one or more TPU resins as a concentrate in a base resin, the ratio of the TPU resin to base resin ranging from about 20:1 to about 3:1. The loading percentage of concentrate in the base resin ranges from about 0.5% to about 10%. In one exemplary embodiment, the loading percentage of the second UV absorber as a concentrate is about 0.5% by weight in the base resin, and a thickness of the film is no greater than 30 mils. In another exemplary embodiment, the concentration loading of the second UV absorber is about 8.5 PPH and a thickness of the film is no greater than 15 mils.

The optical films of the present invention are preferably capable of blocking at least about 95% of light having a wavelength ranging from about 100 nm to about 410 nanometers, preferably between about 380 and 410 nanometers. In an exemplary embodiment, the optical films are capable of blocking greater than about 99.9% of light having a wavelength ranging from about 380 nm to 400 nm or at least 99% of light having a wavelength of about 400 nm.

In certain embodiments, the optical films have a yellowness index (YI value) that is no greater than about 3.0, preferably no greater than about 2.5. In certain embodiments, the YI value is less than 2.0.

In certain embodiments, the thickness of the film and the concentration of the second UV absorber is optimized. In one embodiment, a loading percentage of the second UV absorber as a concentrate is about 0.5% by weight in a base resin, and a thickness of the film is no greater than 30 mils. In another embodiment, the concentration loading of the second UV absorber is about 8.5 PPH and the thickness of the film is no greater than 15 mils.

In another aspect, compositions comprise an aliphatic thermoplastic polyurethane (TPU) resin that includes a first UV absorber selected from the group consisting of the benzotriazole family or the triazin family, and a light stabilizer. The composition further comprises a base resin that includes a second UV absorber. The second UV absorber is preferably selected from a group consisting of benzotriazoles, benzophenones, triazin or benzylidene malonate.

In certain embodiments, the base resin includes a second TPU resin. A ratio of the TPU resin to the base resin including the second UV absorber ranges from about 20:1 to about 3:1, preferably from about 10:1 to about 7:1. The loading percentage of concentrate in the base resin ranges from about 0.5% to about 10%. In one exemplary embodiment, the loading percentage of the second UV absorber as a concentrate is about 0.5% by weight in the base resin, and a thickness of the film is no greater than 30 mils. In another exemplary embodiment, the concentration loading of the second UV absorber is about 8.5 PPH and a thickness of the film is no greater than 15 mils.

In another aspect, the present disclosure relates to a composite including a first layer of glass, a second layer of glass, and a film between the first layer and the second layer of glass. The film is made from a TPU resin composition, a first UV absorber from the benzotriazole family or the triazin family, a light stabilizer, and a second UV absorber.

In certain embodiments, the second UV absorber is combined with the TPU resin as a concentrate in a base resin, the ratio of TPU resin to the base resin including the second UV absorber concentratee ranging from about 20:1 to about 3:1. The loading percentage of concentrate in the base resin ranges from about 0.5% to about 10%. In one exemplary embodiment, the loading percentage of the second UV absorber as a concentrate is about 0.5% by weight in the base resin, and a thickness of the film is no greater than 30 mils. In another exemplary embodiment, the concentration loading of the second UV absorber is about 8.5 PPH and a thickness of the film is no greater than 15 mils.

The composites disclosed herein are preferably capable of blocking at least about 95% of light having a wavelength ranging from about 100 nm to about 410 nanometers, preferably between about 380 and 410 nanometers. In an exemplary embodiment, the composites are capable of blocking greater than about 99.9% of light having a wavelength ranging from about 380 nm to 400 nm or at least 99% of light having a wavelength of about 400 nm.

In another aspect, the present disclosure relates to a method for producing optical films. The methods include: preparing a mixture by combining a) a first resin composition having a TPU, a first UV absorber of the benzotriazole family or the triazin family, and a light stabilizer and b) a concentrate containing a second UV absorber combined with a second resin; melting and extruding the mixture of the first and second resins; and feeding the mixture containing the first and second resins through a die to create an optical film.

In certain embodiments, a loading concentration of the second UV absorber in the second resin is about 10 PPH. In an exemplary embodiment, the concentrate comprises Tinuvin 326.

In certain embodiments, the combining includes dry blending at least 7 parts per hundred of the second resin into the first resin.

In a further aspect, composite materials include a TPU layer having UV absorbing characteristics and an infrared ("IR") cutoff layer, combined with glass or artificial glass layer to form a window for a vehicle, building, or other structure.

In an aspect, a composite comprises a first layer of glass, a second layer of glass, a first layer of TPU between the first layer of glass and the second layer og glass, and a polyethylene terephalate ("PET") layer between the first layer of glass and the second layer of glass.

It is to be understood that both the foregoing general description and the following detailed description are exemplary and explanatory only and are not restrictive of the disclosure. Additional features of the disclosure will be set forth in part in the description which follows or may be learned by practice of the disclosure.

BRIEF DESCRIPTION OF THE DRAWINGS

The accompanying drawings, which are incorporated in and constitute a part of this specification, illustrate several embodiments of the disclosure and together with the description serve to explain the principles of the disclosure.

DETAILED DESCRIPTION

This description and the accompanying drawings illustrate exemplary embodiments and should not be taken as limiting, with the claims defining the scope of the present disclosure, including equivalents. Various mechanical, compositional, structural, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated aspects that are described in detail With reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment. Moreover, the depictions herein are for illustrative purposes only and do not necessarily reflect the actual shape, size, or dimensions of the system or illustrated components.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

The present laminates and composite materials include optical films made from polymers, such as ethyl co-vinyl acetate ("EVA"), a thermoplastic polyurethane ("TPU") resin composition, or other polymers. For example, the TPU resin composition can include one or more ultraviolet light ("UV") absorbers, and a light stabilizer. The films made from such TPU resin compositions have desirable optical characteristics provided by the combination of UV absorbers.

Composite materials disclosed herein include layers of glass or artificial glass, which may include an IR cutoff layer, and a polymer layer selected from TPU or EVA. The polymer layer selected from TPU or EVA desirably includes a UV absorber, and/or a UV absorber and light stabilizer, and may include more than one UV absorber. Specific examples of TPU compositions are disclosed.

Figure 1:
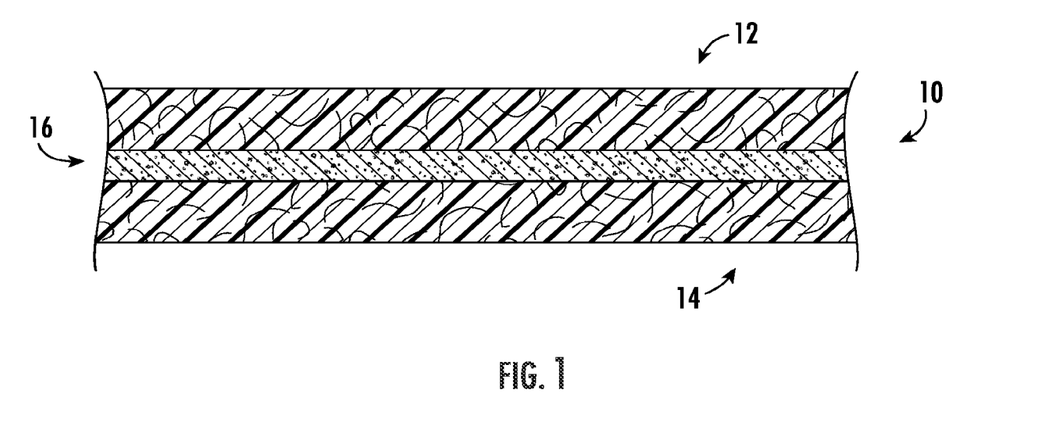
FIG. 1 is a cross-sectional view of a composite glass including one of the optical films of the present disclosure.

The UV absorbing TPU layer may be incorporated in a composite and combined with other layers, such as glass or artificial glass. Referring now to FIG. 1, a composite 10 according to the present disclosure comprises first and second layers of glass 12, 14 and a film 16 between the first layer and the second layer of glass. Film 16 may include any of the optical film compositions described herein. In certain embodiments, a window is provided that includes the composite. Optical film 16 may be laminated between at least two sheets of glass substrates facing each other in order to reflect light rays having particular wavelengths in the infrared region.

Glass layers 12, 14 may comprise any clear or ultraclear glass of a type that is suitable for use in for image sensors, electronic display screens for computers and mobile devices, food packaging, optical disk devices, appliances and the like. Examples include PPG Clear glass, Solarphire® glass or PPG Starphire® glass. Clear glass is preferred so that when the window is illuminated with sunlight, less energy from IR light will be absorbed in glass layer 12 and more energy will be reflected back out of the outside layer of glass and away from the window. Ultraclear glass is more preferred because it absorbs less energy from IR light than clear glass and because its higher transmittance allows more light to be reflected.

There are of course, other substantially clear materials that can be used as layers 12, 14 to provide rigidity and strength to an optical sheet. These alternative materials include polymeric materials such as, for example, acrylic, polyethylene teraphthalate ("PET") or polycarbonate ("PC"). A glazing component can be substantially planar or have some curvature. It can be provided in various shapes, such as a dome, conical, or other configuration, and cross-sections, with a variety of surface topographies. The present invention is not intended to necessarily be limited to the use of any particular glazing component material(s) or structure.

Figure 2:
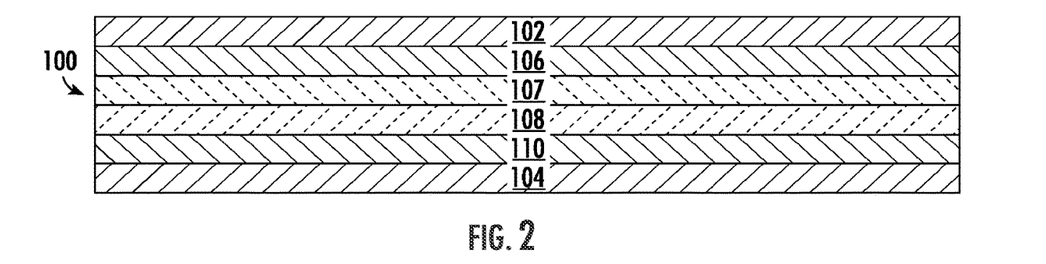
FIG. 2 is a cross-sectional view of a composite material according to an embodiment, including a layer of glass.

FIG. 2 shows a composite material 100 having a first layer of glass 102, a second layer of glass 104, at least one thermoplastic polyurethane ("TPU") resin film 106 between the first layer of glass and the second layer of glass, and a polyethylene teraphthalate ("PET") film 108 between the first layer of glass and the second layer of glass. In embodiments, the TPU resin includes one or more TPU resins, an ultraviolet ("UV") absorber, and a light stabilizer. The TPU layer 106, and any of the TPU layers in the examples discussed below, can have a UV absorber selected from the group consisting of the benzotriazole family and the triazin family, and can be a TPU layer as discussed below. The TPU layer 106 can have one or more UV absorbers. In other examples, ethylene co-vinyl acetate ("EVA") is used as film 106 instead of TPU.

In an example, the composite material 100 has a first layer of glass 102, a first TPU resin film 106 including a TPU resin, a transparent IR cut-off layer, which may be formed by sputter deposition 107, a polyethylene teraphthalate ("PET") film 108, another TPU resin film 110, and a final layer of glass 104 (see FIG. 2). The TPU resin film 110 can be a TPU layer as discussed below, or another TPU layer, which may include a UV absorber. The layers of glass 102 and 104 are between about 1 millimeter and about 2 millimeters in thickness, more preferably about 2.1 milimeters, and the TPU layers are each between about about 350 micrometers and about 400 micrometers, and more preferably about 380 micrometers. The PET layer 108 is between about 20 micrometers and about 30 micrometers, and more preferably about 25 microns, for a total overall thickness of between about 2 to about 6 millimeters for the composite. In an example, the TPU resin film or films include one or more TPU resins, one or more ultraviolet ("UV") absorbers, and a light stabilizer.

In an example of forming a glass composite material, a PET film is coated with the transparent IR cutoff coating, and this coating is formed by sputter deposition, plasma deposition, or other methods. The TPU film is preferably formed by extrusion.

Figure 3:
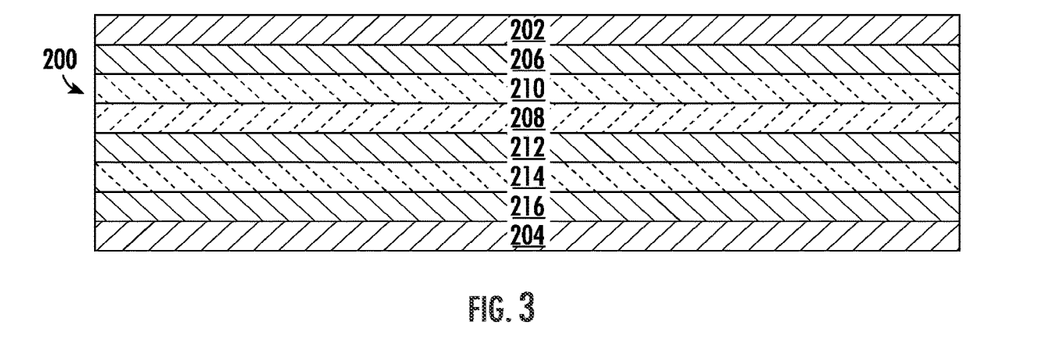
FIG. 3 is a cross-sectional view of a composite material according to another embodiment, including a layer of glass.

In another example shown in FIG. 3, the composite material 200 has a first layer of glass 202, a first TPU layer 206, a transparent IR cutoff layer 210, which maybe formed by sputter deposition, a PET film 208, a second TPU layer 212, a low emmisivity ("low-E") layer 214, which may be formed by sputter deposition, a third TPU layer 216, and a second layer of glass 204. The composite materials 100 and 200 may be used as a window, windshield, roof, or skylight of an automobile, boat or other vehicle. The IR cut-off and low-E layers are applied by sputter deposition, plasma deposition, or other methods. Examples of TPU resin layers can include one or more TPU resins, one or more ultraviolet ("UV") absorbers, and a light stabilizer. The TPU layers may be as discussed below, or other TPU layers, which may include a UV absorber. In further examples, EVA is used instead of TPU.

The entire disclosures of European Patent No. 2 651 639 and European Patent No. 3 387 050 are hereby incorporated by reference herein, disclosing energy shielding films and low emissivity coatings.

In an example of forming a glass composite material, a PET film is coated with the transparent IR cutoff coating, and this coating is formed by sputter deposition, plasma deposition, or other methods. The TPU or EVA film is preferably formed by extrusion. The low-emmisivity ("low-E") layer 214 layer is preferably formed by sputter deposition on the TPU layer 212. However, other deposition methods could be used.

The example above, having three TPU layers, desirably includes UV absorbers. This example has the advantage that an additional layer of UV shielding further shields a vehicle from unwanted heat and radiation. These layers being about 300 micrometers thick, they do not significantly add to the thickness of the composite material.

Vehicles are increasingly incorporating more and more technical features, such as autonomous driving, navigation systems, Bluetooth connectivity to devices such as phones, safety systems, etc. These systems are affected by electromagnetic interference ("EMI"), and communicate wirelessly in some cases. It is therefore desirable to incorporate EMI shielding in the composite material, so that natural light passes through the composite, but the vehicle is protected from unwanted and even harmful interference.

Figure 4:
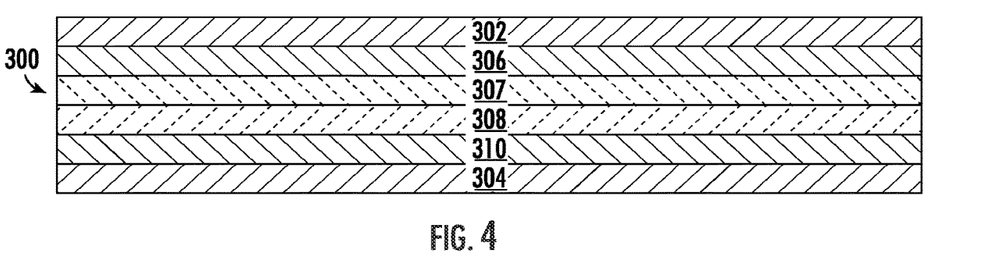
FIG. 4 is a cross-sectional view of a composite material according to a further embodiment, including a layer of glass.

In an example shown in FIG. 4, the composite material 300 has a first layer of glass 302, a first TPU resin film 306 including a TPU resin, a transparent infrared ("IR") cut-off layer, which may be formed by sputter deposition 307, a PET film 308, a second TPU resin film 310, and a final layer of glass 304. The IR cut-off layer 307 includes transparent EMI shielding. The layers of glass 302 and 304 are between about 1 milimeter and about 2 millimeters in thickness, more preferably about 2.1 mm, and the TPU layers are each between about 350 micrometers and about 400 micrometers, more preferably about 380 micrometers. The PET layer 308 is between about 20 micrometers and about 30 micrometers, and more preferably about 25 microns, for a total overall thickness of between about 2 to about 6 millimeters for the composite. In embodiments, the TPU resin layers include one or more TPU resins, one or more ultraviolet ("UV") absorbers and a light stabilizer. The TPU layers may be as discussed below, or can be other TPU layers, which may include a UV absorber.

Figure 5:
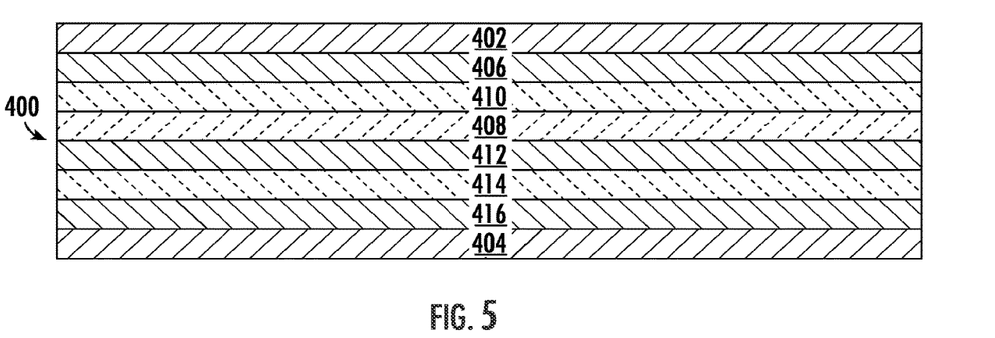
FIG. 5 is a cross-sectional view of a composite material according to another embodiment, including a layer of glass.

In another example shown in FIG. 5, the composite 400 has a first layer of glass 402, a first TPU layer 406, an IR cutoff and transparent EMI shield layer 410, which may be formed by sputter deposition, a PET film 408, a second TPU layer 412, a low-E layer 414, which may be formed by sputter deposition, a third TPU layer 416, and a second layer of glass 404. The sputtered layers can be formed by sputter deposition, plasma deposition, or other methods. The composite material 300 or 400 may be used as a window, windshield, roof, or skylight of an automobile, boat or other vehicle.

The example above having three TPU layers desirably includes UV absorbers. This example has the advantage that an additional layer of UV shielding further shields a vehicle from unwanted heat and radiation. These layers being about 300 micrometers thick, they do not significantly add to the thickness of the composite material.

In further examples, the IR cut-off and transparent EMI shielding layers 307 and 410 can include a transparent antenna made from a precious metal like silver, in the form of wires, such as nanowires. The antenna can be formed from semiconductor nanowires. The antenna further protects the technical features built into a vehicle from cross-talk, and other interference. The nanowires can be incorporated into the IR cut-off and EMI shield sputtered material as a composite and deposited in a sputtering process. Alternatively, each of the IR cutoff, EMI shielding, and/or antenna can be sputtered or otherwise deposited in two or three separate layers.

Figure 6:
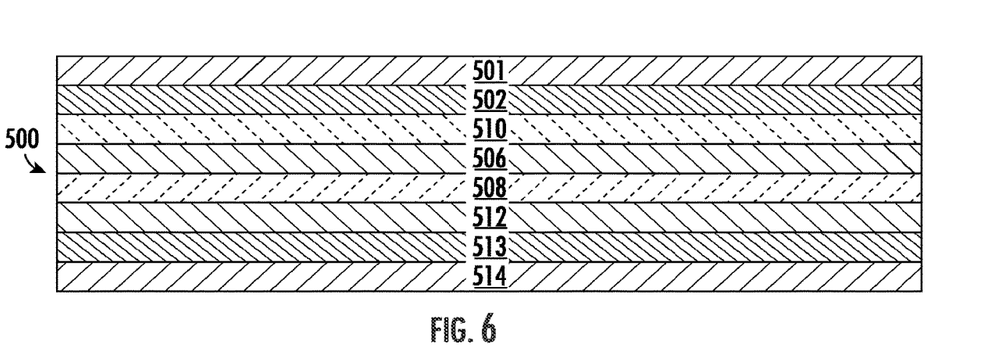
FIG. 6 is a cross-sectional view of a composite material according to an embodiment, including a polymeric layer.

In another exemplary embodiment, FIG. 6 shows an artificial glass composite material using polycarbonate ("PC") sheets having good optical characteristics. Artificial glass made from a polymer has benefits in that the material can more easily be shaped in all three directions, making such composites very good candidates for windshields, sunroofs, windows and other features for vehicles. The following examples utilize PC sheets with a high degree of visible light transmission ("VLT"), such as 70% and more preferably 80% or higher. The PC sheets desirably have low haze of 3% or less and more preferably less than 1%. The artificial glass desirably includes a top coat to protect from scratches, and chemical and environmental damage. The top coat is made from urethanes, acrylates, methacrylates, such as 2 k fluoro, 1 k polyethylene, 2 k acrylic, 2 k urethane, 1 k acrylic, or urethane primer with UV acrylic. The top coat can be applied by dispersion. The artificial glass also has the advantage that the polymer layers can be extruded and the handling of molten glass is avoided. Furthermore, artificial glass is lighter than the glass composite material, adding better fuel economy to a vehicle such as an automobile.

The composite material 500 has a first PC film 502, a second PC film 504, at least one TPU layer 506, and a PC sheet 508. The TPU resin includes one or more TPU resins, and desirably has at least one ultraviolet ("UV") absorber, and a light stabilizer. The TPU layer 506, for example, has an UV absorber selected from the group consisting of the benzotriazole family and the triazin family. The TPU layers may be as discussed below, or can be other TPU layers, which may include a UV absorber.

In an example shown in FIG. 6, the composite material 500 has a first PC film 502, a transparent IR cut-off layer 510, a first TPU layer 506, a PC sheet 508, a second TPU layer 512, and a second PC film 513. The IR cut-off layer is applied by sputter deposition or other methods. The TPU layers have a thermoplastic polyurethane. The TPU layers may be as discussed below, or can be other TPU layers, which may include a UV absorber. The PC sheet has a visible light transmissibility of 80% and more desirably 90%. The PC sheet has low haze of 3% or less, and more preferably less than 1%. Desirably, a top coat is applied to each of the PC films (see top coat 501 and top coat 514), to protect against scratches, environmental damage and the like. The top coats mentioned above can be used.

Figure 7:
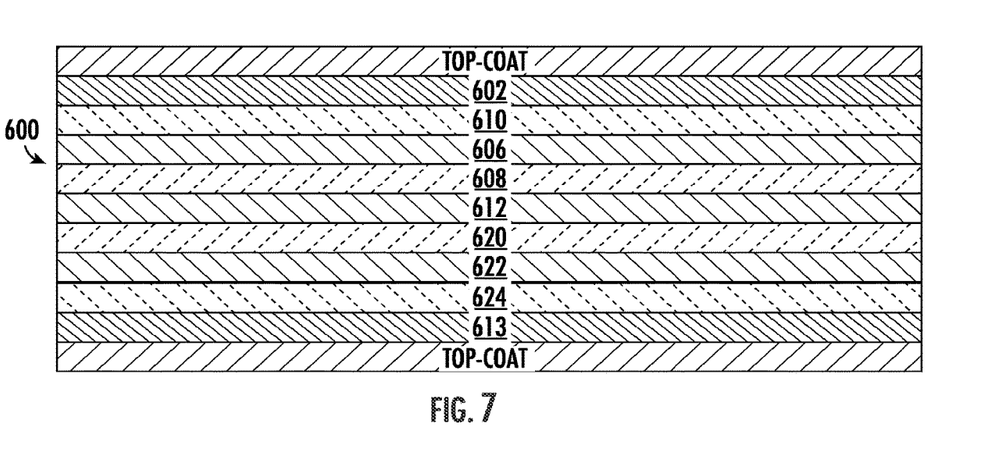
FIG. 7 is a cross-sectional view of a composite material according to another embodiment, including a polymeric layer.

In another example, the composite material 600 shown in FIG. 7 has a first PC film 602 a transparent IR cut-off layer 610, which can be applied by sputter deposition or other methods, a first TPU layer 606, a first PC sheet 608, a second TPU layer 612, a second PC sheet 620, a third TPU layer 622, a transparent low-E layer, which may be applied by sputter deposition 624 or other methods, and a second PC film 613. A top coat may be applied to each of the PC films. The top coat may be any of the top coats discussed above. A top coat can be applied to the first layer of PC 602 and the second layer of PC 613 to protect against scratches, environmental and other damage. A top coat 601 is desirably applied to first layer of PC 602 and top coat 614 is desirably applied to second layer of PC 613. The composite 600 may be used as a window, windshield, roof, or skylight of an automobile, boat, or other vehicle.

The example above, having three TPU layers, desirably includes UV absorbers. This example has the advantage that an additional layer of UV shielding further shields a vehicle from unwanted heat and radiation. These layers being about 300 micrometers thick, they do not significantly add to the thickness of the composite material.

The TPU layers 606, 612, and 622 can be about 380 micrometers thick. The PC sheets 608 and 620 can be between about 1 milimeter and 3 millimeters, more preferably about 2.1 mm and have a visible light transmission ("VLT") of about 70%, more preferably 80%, with a haze less than about 3% more preferably less than about 1%.

Benefits and features of artificial glass include that the material is lightweight, leading to improved gas mileage for vehicles. In addition, the IR cut-off layer also reduces electrical consumption. Utilizing PC sheets with good optical characteristics, the composite provides a transparent window while being thermoformable and avoiding the handling and forming of molten glass.

Figure 8:
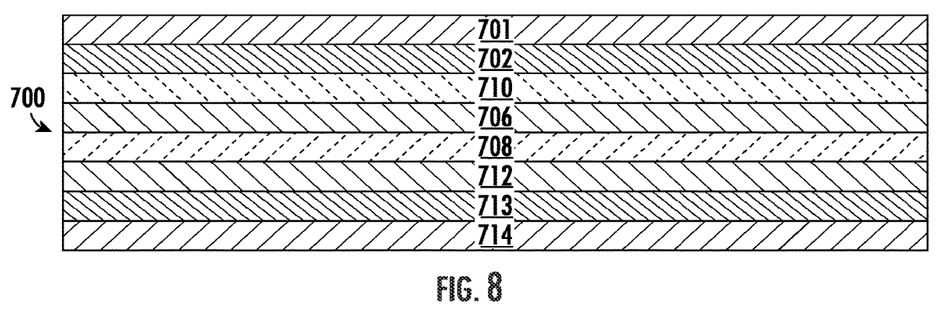
FIG. 8 is a cross-sectional view of a composite material according to a further embodiment, including a polymeric layer.

In another exemplary embodiment, FIG. 8 shows an artificial glass using PC sheets having good optical characteristics. In the following examples, the PC sheets have a high degree of visible light transmission and low haze, such as mentioned in examples above. The artificial glass can include a top coat to protect from scratches, and chemical and environmental damage. The top coats are as mentioned above. The artificial glass also has the advantage that the polymer layers can be extruded and the handling of molten glass is avoided. Furthermore, artificial glass is lighter than the glass composite material, adding better fuel economy to a vehicle such as an automobile.

The composite material 700 has a first PC film 702, a second PC film 713, at least one TPU layer 706, and a PC sheet 708. For example, the TPU resin includes one or more TPU resins, one or more UV absorbers and a light stabilizer. The TPU layer can have an UV absorber selected from the group consisting of the benzotriazole family and the triazin family. The TPU layers may be as discussed below, or can be other TPU layers, which may include a UV absorber.

In the example shown in FIG. 8, the composite material 700 has a first PC film 702, a transparent IR cut-off layer 710, a first TPU layer 706, a PC sheet 708, a second TPU layer 712, and a second PC film 713. The transparent IR cut-off layer is applied by sputter deposition, plasma deposition, or other methods, and includes transparent EMI shielding. The PC sheet has a visible light transmissibility of about 70%, more preferably 80%, low haze of less than about 3%, more preferably less than 1%, and premium optical requirements. Desirably, a top coat is applied to each of the PC films, to protect against scratches, ans chemical and environmental damage. For example, top coat 701 is applied to PC film 702 and top coat 714 is applied to PC film 713. The top coat can be as discussed in the examples above.

Figure 9:
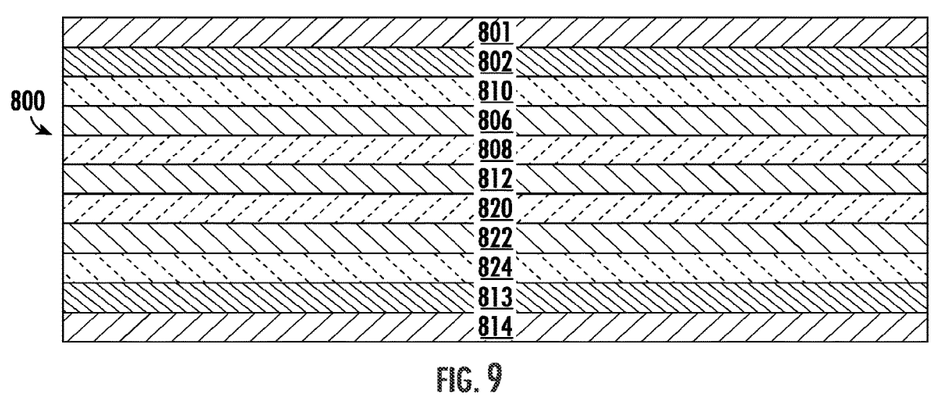
FIG. 9 is a cross-sectional view of a composite material according to another embodiment, including a polymeric layer.

In another example, the composite material 800 shown in FIG. 9 has a first PC film 802 a transparent IR cut-off layer 810 applied by sputter deposition or other methods, a first TPU layer 806, a first PC sheet 808, a second TPU layer 812, a second PC sheet 820, a third TPU layer 822, a transparent low-E layer 824 applied by sputter deposition or other methods, and a second PC film 813. For example, the transparent IR cut-off layer is applied by sputter deposition and includes transparent EMI shielding.

In the example above, the three TPU layers desirably include UV absorbers. This example has the advantage that an additional layer of UV shielding further shields a vehicle from unwanted heat and radiation. These layers being about 300 micrometers thick, they do not significantly add to the thickness of the composite material.

A top coat can be applied to the first layer of PC and the second layer of PC to protect against scratches and chemical and environmental damage. For example, a top coat 801 is applied to PC film 802 and top coat 814 is applied to PC film 813. The top coat can be a top coat from any of the examples discussed above. The composite 800 may be used as a window, windshield, roof, or skylight of an automobile, boat, or other vehicle.

The TPU layers 806, 812, and 822 can be about 380 micrometers in thickness. The PC sheets can be between about 1 milimeter to about 3 millimeters, more preferably about 2.1 mm and have a visible light transmission ("VLT") of about 70%, more preferably about 80%, with a haze less than about 3% more preferably less than 1%, and premium optical requirements.

Benefits and features of artificial glass include that the material is lightweight, leading to improved gas mileage for vehicles. In addition, the IR cut-off layer also reduces electrical consumption. Utilizing PC sheets with good optical characteristics, the composite provides a transparent window while being thermoformable and avoiding the handling and forming of molten glass. With the increasing use of autonomous driving in modern cars, as well as other safety features, protection against electromagnetic interference ("EMI"), cross-talk and other problems is necessary.

The examples of FIGS. 8 and 9 can include an IR cut-off layer that is formed by sputtering. The IR cut-off layer can include a low emissivity material and electromagnetic interference ("EMI") shielding. The energy shielding plastic films disclosed herein reduce energy consumption. For example, the use of air conditioning can be reduced. In addition, the need for EMI shielding comes from the increasing use of autonomous driving features and other features in modern automobiles.

In further examples, the IR cut-off and EMI shielding layers 710 and 810 can include an invisible antenna made from a precious metals in the form of wires, such as nanowires. The nanowires are incorporated into the infrared cut-off and EMI shielding sputtered material as a composite and deposited in a sputtering process, or may be deposited in multiple layers.

In any of the artificial glass embodiments discussed above, the laminate may be formed as follows. The first polycarbonate film is coated with the IR cutoff coating, which is applied by sputter deposition, plasma deposition, or other method. The EVA or TPU film is desirably formed by extrusion. The various layers are laminated together and the top coat is applied by dispersion or other method. In embodiments having the low-E layer, this layer is desirably formed by sputter deposition onto the second polycarbonate film. The top coat material is desirably transparent for mid and far IR radiation.

The transparent antennas can be printed on polymeric films, such as silver nanowire printed on a polymer film, like the polycarbonate and other films discussed herein. Nanowire transparent antennas for the examples above can be made from transparent conductive oxides, conductive polymers, and nanocarbon.

Specific examples of TPU compositions include those disclosed below. TPU resin compositions in accordance with this disclosure may include any aliphatic polyether-based TPU that provides sufficient transparency and may exhibit suitable adhesion to glass, polycarbonate, acrylyic, cellulose acetate butyrate, or other surfaces which the films may contact. In embodiments, suitable TPU resins may be polyether-based and made from methylene diphenyl diisocayanate (MDI), polyether polyol, and butanediol. In embodiments, the TPU resin may be Estane AG-8451 Resin sold by Lubrizol. In embodiments the TPU resin may be present in the resin composition in an amount from about 95 to about 99.99% by weight; in certain embodiments, from about 98 to about 99.99% by weight, in other embodiments from about 99.5% to about 99.99%.

TPU resin compositions in accordance with this disclosure also include a first UV absorber. In embodiments the first UV absorber may be present in the TPU resin composition in an amount from about 0.1 to about 1% by weight; in embodiments, from about 0.3 to about 0.5% by weight.

In certain embodiments, the first UV absorber may be any suitable UV absorber made from compounds in the benzotriazole family. Non-limiting examples of benzotriazole-type UV absorbers include compounds of the formula:

wherein $R_9$, $R_{10}$, and $R_{11}$ are individually selected from hydrogen, a group having a formula $C_aH_bN_cO_dS_e$ wherein a, b, c, d, and e are from 0 to 30, and halogen. Non-limiting examples of benzotriazole-type UV absorbers which may be used as the first UV absorber include 2-(2H-benzotriazol-2-yl)-4,6-bis(1,1-dimethylpropyl)-phenol; phenol, 2,2'-methylene-bis(6-(2H-benzotriazol-2-yl)-4-(1,1,3,3-tetramethyl-butyl)); 2-(2'-Hydroxy-3',5'-di-t-amylphenyl)benzotriazole; 2-Hydroxy-4-methoxybenzophenone; 2-[2-hydroxy-3,5-di(1,1-dimethylbenzyl)phenyl]; 2-(5-tert-Butyl-2-hydroxyphenyl)-2H benzotriazole; 2-(2-hydroxy-5-methylphenyl)benzotriazole; 2-(2H-Benzotriazol-2-yl)-4-(1,1,3,3-tetramethylbutyl)phenol; 2,4-Di-tert-butyl-6-(5-chloro-2H-benzotriazol-2-yl)phenol; 2-(2'-Hydroxy-3',5'-di-tert-butylphenyl)benzotriazole; 3-(2H-Benzotriazolyl)-5-(1,1-di-methylethyl)-4-hydroxy-benzenepropanoic acid octyl esters; methyl 3-[3-tert-butyl-4-hydroxy-5-(5-chloro-2H-benzotriazol-2-yl)phenyl]propionate; 2-(2H-Benzotriazol-2-yl)-6-(1-methyl-1-phenylethyl)-4-(1,1,3,3-tetramethyl-butyl)phenol; reaction products of methyl 3-(3-(2H-benzotriazole-2-yl)-5-t-butyl-4-hydroxyphenyl)propionate/PEG 300; 2-(2'-Hydroxy-5'-(2-hydroxyethyl))-benzotriazole; 2-(2'-Hydroxy-5'methacryloxyethylphenyl)-2H-benzotriazole; 2-[4,6-Bis(2,4-dimethylphenyl)-1,3,5-triazin-2-yl]-5-(octyloxy)phenol; or any combinations thereof. In other embodiments, the first UV absorber may be of the benzophenone family. Non-limiting examples of benzophenone-type UV absorbers which may be used as the first UV absorber include: 2,4-dihydroxy benzophenone; 2-hydroxy-4-methoxybenzophenone; 2-hydroxy-4-n-(octyloxy)benzophenone; 2,2',4,4'-tetrahydroxybenzophenone; 2,2'-dihydroxy-,4,4'-dimethoxy benzophenone; sulisobenzone; 2-hydroxy-4-n-octoxybenzophenone; 2,2'-dihydroxy-4-methoxy benzophenone; 2-hydroxy-4-methoxybenzophenone; 2,2'-dihydroxy-4,4'-dimethoxy benzophenone; 2,2',4,4'-tetrahydroxybenzophenone; and combinations thereof.

In other embodiments, the first UV absorber may be of the triazin family. Non-limiting examples of triazin-type UV absorbers which may be used as the first UV absorber include: 2-(4,6-diphenyl-1,3,5-triazin-2-yl)-5-[(hexyl)oxy]-phenol.

In other embodiments, the first UV absorber may be of the benzylidene malonate family. Non-limiting example of benzylidene malonate-type UV absorbers which may be used as the first UV absorber include: Propanedioic acid [(4-methoxyphenyl)-methylene]-dimethyl ester).

Other non-limiting examples of benzophenone-type UV absorbers which may be used as the first UV absorber include: 2,4-dihydroxy benzophenone; 2-hydroxy-4-methoxybenzophenone; 2-hydroxy-4-n-(octyloxy)benzophenone; 2,2',4,4'-tetrahydroxybenzophenone; 2,2'-dihydroxy-,4,4'-dimethoxy benzophenone; sulisobenzone; 2-hydroxy-4-n-octoxybenzophenone; 2,2'-dihydroxy-4-methoxy benzophenone; 2-hydroxy-4-methoxybenzophenone; 2,2'-dihydroxy-4,4'-dimethoxy benzophenone; 2,2',4,4'-tetrahydroxybenzophenone; and combinations thereof.

TPU resin compositions in examples according to this disclosure can include a light stabilizer. Suitable light stabilizers primarily protect the polymers of the optical film from the adverse effects of photo-oxidation caused by exposure to UV radiation. In embodiments, the light stabilizer may serve a secondary function of acting as a thermal stabilizer, for low to moderate levels of heat. In embodiments, the light stabilizer of a resin composition in accordance with this disclosure may be included in an amount from about 0.1 to about 1% by weight; in embodiments, from about 0.1 to about 0.2% by weight.

In certain embodiments, suitable light stabilizers may be derivatives of tetramethylpiperidine. In embodiments, the light stabilizer may be any suitable hindered amine light stabilizer (HALS or NOR-HALS). In certain embodiments, the light stabilizer may be made by combining bis(1,2,2,6,6-pentamethyl-4-piperidyl)sebacate with methyl 1,2,2,6,6-pentamethyl-4-piperidyl sebacate.

Non-limiting examples of light stabilizers useful in the resin compositions of the present disclosure include bis-(2,2,6,6-tetramethyl-4-piperidinyl)sebacate; bis-(1,2,2,6,6-pentamethyl-4-piperidinyl)-2-n-butyl-2-(3,5-di-tert-butyl-4-hydroxybenzyl)malonate; propanedioic acid, [(4-methoxyphenyl)-methylene]-bis-(1,2,2,6,6-pentamethyl-4-piperidinyl)ester; 10 wt % of dimethyl succinate polymer with 4-hydroxy-2,2,6,6,-tetramethyl-1-piperidineethanol and 90 wt % of N,N'''-[1,2-ethanediylbis[[[4,6-bis[butyl(1,2,2,6,6-pentamethyl-4-piperidinyl)amino]-1,3,5-traizin-2-yl]imino]-3,1-propanediyl]]bis[N'N'''-dibutyl-N'N'''-bis(1,2,2,6,6-pentamethyl-4-piperidinyl)]-I; or combinations thereof. In embodiments, the light stabilizer is bis(1,2,2,6,6-pentamethyl-4-piperidyl)sebacate combined with methyl 1,2,2,6,6-pentamethyl-4-piperidyl sebacate Chisorb 292 sold by Double Bond Chemical Ind. Co., Ltd., Eversorb 93, sold by Everlight Chemical, RIASORB UV-292 sold by Rianion Corp, Thasorb UV-292 sold by Rianlon Corp., Sabostab UV 65, sold by SABO, Westco UV-292 sold by Western Reserve Chemical, UV-292/UV-292HP sold by Performance Solutions, Inc., and FENTASTAB 292 sold by Jiangsu Forpi Chemicals Co., Ltd or any combination thereof.

Further examples of TPU resin compositions used in embodiments in accordance with this disclosure can include a second UV absorber which, when combined with the TPU resin, light stabilizer and the first UV absorber, imparts a particular combination of optical characteristics to a film made from the resin composition; namely, the resulting film is capable of blocking about 95% of light having a wavelength ranging from about 10 to about 410 nm, preferably about 380 nm to about 410 nm. In certain embodiments, the film is capable of blocking greater than 99.9% of light having a wavelength ranging from about 380 nm to 400 nm and has a yellowness index (YI value) that is no greater than 3.0, preferably no greater than 2.5. In other embodiments, the film is capable of blocking no less than 99% of light having a wavelength of about 400 nm.

In embodiments, the second UV absorber is present in an amount from about 0.001% to about 2.0% by weight; in embodiments, the second UV absorber is present in the resin composition in an amount from about 0.5% to about 1.0% by weight.

In certain embodiments, the second UV absorber may be any suitable UV absorber of the benzotriazole family, the benzophenone family, the triazin family or the benzylidene malonate family that provides the foregoing combination of optical characteristics, such as the compounds lists above with respect to the first UV absorber. Non-limiting examples of benzotriazole-type UV absorbers suitable for use as the second UV absorber include compounds of the formula:

wherein $R_9$, $R_{10}$, and $R_{11}$ are individually selected from hydrogen, a group having a formula $C_aH_bN_cO_dS_e$ wherein a, b, c, d, and e are from 0 to 30, and halogen, where at least one of $R_9$, $R_{10}$, or $R_{11}$ is halogen. In embodiments, the second UV absorber is phenol, 2-(5-chloro-2H-benzotriazol-2-yl)-6-(1,1-dimethylethyl)-4-methyl.

The resin composition may be prepared by preparing a composition including one or more TPU resins, the first UV absorber and a light stabilizer. The composition is combined with a concentrate containing the second UV absorber in a base resin including the same or a different TPU resin. In embodiments, the base resin and the concentrate are dry blended. In embodiments, the ratio of TPU resin to base resin is from about 20:1 to about 3:1, preferably from about 10:1 to about 7:1. The second UV absorber may be present in the concentrate by an amount of about 9.5% by weight.

In an example, the optical film has a thickness of about 5 mils to 50 mils. In one embodiment, the concentration of the second UV absorber is about 0.8% by weight and the thickness of the film is no greater than 15 mils. In another embodiment, the concentration of the second UV absorber is about 0.5% by weight and the thickness of the film is no greater than 25 mils.

In an exemplary embodiment, optical films in accordance with the present disclosure may have: a thickness in the range of from about 1 mil to about 50 mils, in embodiments from about 15 mils to about 30 mils; a UV cutoff of about 300 nm to 500 nm, preferably about 350 nm to 400 nm; a light transmission rate of no more than 0.5% to 10% at a wavelength of 400 nm, in embodiments a light transmission rate of no more than about 1%-5% at a wavelength of 400 nm; and a YI (ASTM E313) value that is no greater than 2.5, preferably no greater than about 2.0.

The present optical films may be prepared by a single screw cast film extrusion process, or any other suitable extrusion process within the purview of those of skill in the art. In embodiments, the process begins by dry blending a concentrate containing the second UV absorber with a base resin as described above to provide a mixture. The mixture of base resin and concentrate are then melted and mixed by an extruder. The melted resin composition is then filtered and fed to a die system. The resulting homogenous blend of molten polymer then travels through a flat die system to adopt a final flat film shape. Upon exiting the die, the molten web enters a cooling unit, where it is cooled using a water-cooled chill roll or any suitable cooling mechanism as is known by one of skill in the art. The film is then fed downstream where the edges may be trimmed and the film may be rolled up on a shaft to produce a roll of material.

In a first example, an optical film is prepared by single screw extrusion from the following ingredients: a TPU resin (AG-8451 sold by Lubrizol) containing a light stabilizer produced by a reaction mass of bis(1,2,2,6,6-pentamethyl-4-piperidyl)sebacate and methyl 1,2,2,6,6-pentamethyl-4-piperidyl sebacate (equivalent to Tinuvin 292 sold by BASF, CAS No. 1065336-91-5) and 2-(2H-benzotriazol-2-yl)-4,6-bis(1,1-dimethylpropyl)-phenol as a first UV absorber (equivalent to Tinuvin 328 sold by BASF, CAS No. 25973-55-1). This film is 30 mils thick and is identified as a control film in Table 1 below.

Five additional films (films 1-5) were prepared by compression molding from melt blended formulation prepared in a heated Brabender High Shear Mixer from a TPU resin (AG-8451 sold by Lubrizol) containing a light stabilizer produced by a reaction mass of bis(1,2,2,6,6-pentamethyl-4-piperidyl)sebacate and methyl 1,2,2,6,6-pentamethyl-4-piperidyl sebacate (equivalent to Tinuvin 292 sold by BASF, CAS No. 1065336-91-5) and 2-(2H-benzotriazol-2-yl)-4,6-bis(1,1-dimethylpropyl)-phenol as a first UV absorber (equivalent to Tinuvin 328 sold by BASF, CAS No. 25973-55-1), and 0.5% of a second UV absorber. The added UV absorber present for each of films 1-5 is identified in Table 1 below.

TABLE 1

| | Added UV Absorber | Thickness | Loading (%) | UV Cutoff (nm) | % Light Blocked @ 400 nm | Avg. % Light Blocked (380-400 nm) | Avg. % Light Blocked (390-410 nm) | Avg. % T (400-900 nm) | YI ASTM E313 |
|---|---|---|---|---|---|---|---|---|---|
| AG8451 Control | None | ~30 mils | — | 375.8 | 21.1 | 61.15 | 26.2 | 92.6 | 0.54 |
| Film 1 | 2,4-Dihydroxybenzophenone | ~30 mils | 0.50% | 382.3 | 39.4 | 78.31 | 44.2 | 89.3 | 2.42 |
| Film 2 | Tinuvin 326 | ~30 mils | 0.50% | 401.1 | 99.6 | 99.95 | 94.9 | 86 | 4.57 |
| Film 3 | Tinuvin 360 | ~30 mils | 0.50% | 390.5 | 63.7 | 93.08 | 64.3 | 85 | 4.97 |
| Film 4 | Tinuvin 640 | ~30 mils | 0.50% | 387.8 | 58.5 | 89.28 | 57.9 | 83.6 | 4.5 |
| Film 5 | Cyasorb UV-5411 | ~30 mils | 0.50% | 383.4 | 33.2 | 75.56 | 39.3 | 88.8 | 2.18 |

Table 1 shows that by adding a concentrate containing Tinuvin 326, an optical film having a UV cutoff of about 400 nm may be achieved. As used herein, UV cutoff generally refers to the wavelength at which substantially all of the UV light is blocked by the UV absorber, typically being absorbed by organic molecules and converted to heat. The percentage of light blocked at 400 nm with the added Tinuvin 326 is greater than the films having the alternative additives. Although the film treated with Tinuvin 360 has a UV cutoff that is closer to 400 than the other films, the YI value is surprisingly greater than Film 2's YI value, despite film 2 having a higher UV cutoff and light blockage percentage. The higher YI values for films 1-5 versus the control film are attributed to processing using the Brabender High Shear Mixer for laboratory preparation of films 1-5. Whereas the control film was produced by commercial single screw extrusion and evidenced less thermal oxidation impact attributed to the process.

In another exemplary embodiment, an optical film is prepared from the following ingredients: a base TPU resin (AG-8451 sold by Lubrizol) containing a light stabilizer produced by a reaction mass of bis(1,2,2,6,6-pentamethyl-4-piperidyl)sebacate and methyl 1,2,2,6,6-pentamethyl-4-piperidyl sebacate (equivalent to Tinuvin 292 sold by BASF, CAS No. 1065336-91-5) and 2-(2H-benzotriazol-2-yl)-4,6-bis(1,1-dimethylpropyl)-phenol as a first UV absorber (equivalent to Tinuvin 328 sold by BASF, CAS No. 25973-55-1), and a concentrate containing 9.5% of a second UV absorber, Phenol, 2-(5-chloro-2H-benzotriazol-2-yl)-6-(1,1-dimethylethyl)-4-methyl (equivalent to Tinuvin 326, sold by BASF CAS No. 3896-11-5, blended in a TPU resin of AG-8451 sold by Lubrizol.

Three different films (1-3) having a thickness of 15 mils were prepared with differing loadings of Tinuvin 326 concentrate. The properties of the three films are contained below in Table 2. It is shown that adding Tinuvin 326 concentrate to the resin composition still blocks a large portion of the UV light at 400 nm while maintaining desired transparency with a YI value that is below 2.0 even when making a thinner film.

described in connection with one exemplary embodiment may be combined with the features of other embodiments. Various alternatives and modifications can be devised by those skilled in the art without departing from the disclosure. Accordingly, the present disclosure is intended to embrace all such alternatives, modifications and variances. As well, one skilled in the art will appreciate further features and advantages of the present disclosure based on the above-described embodiments. Accordingly, the present disclosure is not to be limited by what has been particularly shown and described, except as indicated by the appended claims.

Hereby, all issued patents, published patent applications, and non-patent publications that are mentioned in this specification are herein incorporated by reference in their entirety for all purposes, to the same extent as if each individual issued patent, published patent application, or non-patent publication were specifically and individually indicated to be incorporated by reference.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of presently disclosed embodiments. Thus the scope of the embodiments should be determined by the appended claims and their legal equivalents, rather than by the examples given.

Persons skilled in the art will understand that the devices and methods specifically described herein and illustrated in the accompanying drawings are non-limiting exemplary embodiments. The features illustrated or described in connection with one exemplary embodiment may be combined with the features of other embodiments. Various alternatives and modifications can be devised by those skilled in the art without departing from the disclosure. Accordingly, the present disclosure is intended to embrace all such alternatives, modifications and variances. As well, one skilled in the art will appreciate further features and advantages of the present disclosure based on the above-described embodi-

TABLE 2

| | Film Thickness | Conc Loading (PPH) | UV Cutoff (nm) | % Transmission @ 400 nm | % Light Blocked @ 400 nm | Avg. % Light Blocked (380-400 nm) | Avg. % Light Blocked (390-410 nm) | Avg. % T Blocked (400-900 nm) | YI ASTM E313 |
|---|---|---|---|---|---|---|---|---|---|
| Film 1 | 15 mils | 7.0 | 393.4 | 13.3 | 86.7 | 98.1 | 78.8 | 90.5 | 1.39 |
| Film 2 | 15 mils | 8.5 | 397.4 | 3.5 | 96.5 | 99.6 | 88.0 | 90.8 | 1.93 |
| Film 3 | 15 mils | 10.0 | 396.8 | 4.7 | 95.3 | 99.5 | 86.6 | 90.4 | 1.79 |

Persons skilled in the art will understand that the products and methods specifically described herein are non-limiting exemplary embodiments. The features illustrated or ments. Accordingly, the present disclosure is not to be limited by what has been particularly shown and described, except as indicated by the appended claims.

What is claimed is:

1. A composite, comprising:
   a first layer of glass;
   a second layer of glass;
   a layer of a thermoplastic polyurethane ("TPU") resin composite interposed between the first layer of glass and the second layer of glass; and
   a polyethylene terephthalate ("PET") film interposed between the first layer of glass and the second layer of glass,
   wherein the TPU resin composite comprises a combination of a TPU resin, an ultraviolet ("UV") absorber, and a light absorber,
   wherein the UV absorber comprises a combination of two or more UV absorbers, wherein a first UV absorber is selected from the group consisting of 2-(2H-benzotriazol-2-yl)-4,6-bis(1,1-dimethylpropyl)-phenol, phenol, 2-(5-chloro-2H-benzotriazol-2-yl)-6-(1,1-dimethylethyl)-4-methyl, and combinations thereof, and
   wherein the TPU resin composite, comprising the combination of the TPU resin, the UV absorber, and the light absorber:
      blocks greater than 99.9% of light having a wavelength of from 380 nm to 400 nm,
      blocks greater than 99% of light having a wavelength of about 400 nm, or
      blocks about 95% of light having a wavelength between about 380 and 410 nm.

2. The composite of claim 1, wherein the TPU resin composite, comprising the combination of the TPU resin, the UV absorber, and the light absorber, blocks greater than 99.9% of light having a wavelength of from 380 nm to 400 nm.

3. The composite of claim 1, wherein the light absorber comprises a reaction mass of bis(1,2,2,6,6-pentamethyl-4-piperidyl)sebacate and methyl 1,2,2,6,6-pentamethyl-4-piperidyl sebacate.

4. The composite of claim 1, further comprising an infrared ("IR") cutoff layer interposed between the layer of the TPU resin composite and the PET film.

5. The composite of claim 1, wherein the TPU resin composite comprises a yellowness index, as measured according to ASTM E313, of less than or equal to 3.0.

6. The composite of claim 1, further comprising a low emissivity ("low-E") layer interposed between the PET film and the second layer of glass.

7. The composite of claim 6, wherein the layer of the TPU resin composite is a first layer of the TPU resin composite, and the composite further comprises a second layer of the TPU resin composite interposed between the PET film and the low-E layer.

8. The composite of claim 7, further comprising a third layer of the TPU resin composite interposed between the low-E layer and the second layer of glass.

9. The composite of claim 1, wherein the TPU resin composite, comprising the combination of the TPU resin, the UV absorber, and the light absorber, blocks greater than 99% of light having a wavelength of about 400 nm.

10. The composite of claim 1, wherein the TPU resin composite, comprising the combination of the TPU resin, the UV absorber, and the light absorber, blocks about 95% of light having a wavelength between about 380 and 410 nm.

11. The composite of claim 4, further comprising transparent electromagnetic interference ("EMI") shielding or a transparent antenna in or on the IR cutoff layer.

12. A composite, comprising:
   a first film of polycarbonate ("PC");
   a second film of PC;
   at least one layer of a TPU resin composite interposed layer between the first film of PC and the second film of PC; and
   a PC sheet interposed between the first film of PC and the second film of PC,
   wherein the TPU resin composite comprises a combination of a TPU resin, an ultraviolet ("UV") absorber, and a light absorber, and
   wherein the UV absorber comprises a combination of two or more UV absorbers, wherein a first UV absorber is selected from the group consisting of 2-(2H-benzotriazol-2-yl)-4,6-bis(1,1-dimethylpropyl)-phenol, phenol, 2-(5-chloro-2H-benzotriazol-2-yl)-6-(1,1-dimethylethyl)-4-methyl, and combinations thereof, and
   wherein the TPU resin composite, comprising the combination of the TPU resin, the UV absorber, and the light absorber:
      blocks greater than 99.9% of light having a wavelength of from 380 nm to 400 nm,
      blocks greater than 99% of light having a wavelength of about 400 nm, or
      blocks about 95% of light having a wavelength between about 380 and 410 nm.

13. The composite of claim 12, wherein the TPU resin composite, comprising the combination of the TPU resin, the UV absorber, and the light absorber, blocks greater than 99.9% of light having a wavelength of from 380 nm to 400 nm.

14. The composite of claim 12, wherein the light absorber comprises a reaction mass of bis(1,2,2,6,6-pentamethyl-4-piperidyl)sebacate and methyl 1,2,2,6,6-pentamethyl-4-piperidyl sebacate.

15. The composite of claim 12, wherein the at least one layer of the TPU resin composite is a first layer of the TPU resin composite, and the composite further comprises an infrared ("IR") cutoff layer interposed between the first film of PC and the first layer of the TPU resin composite.

16. The composite of claim 15, wherein the PC sheet is interposed between the first layer of the TPU resin composite and the second film of PC.

17. The composite of claim 16, wherein the PC sheet is a first PC sheet, and the composite further comprises a second layer of the TPU resin composite interposed between the first PC sheet and the second film of PC.

18. The composite of claim 17, wherein the second layer of the TPU resin composite is between the first PC sheet and the second film of PC.

19. The composite of claim 18, further comprising a second PC sheet interposed between the second layer of the TPU resin composite and the second film of PC.

20. The composite of claim 19, further comprising a third layer of the TPU resin composite between the second PC sheet and the second film of PC.

21. The composite of claim 20, further comprising a low-E layer interposed between the third layer of the TPU resin composite and the second film of PC.

22. The composite of claim 12, wherein the TPU resin composite, comprising the combination of the TPU resin, the UV absorber, and the light absorber, blocks about 95% of light having a wavelength between about 380 and 410 nm.

23. The composite of claim 12, wherein the TPU resin composite, comprising the combination of the TPU resin, the UV absorber, and the light absorber, blocks greater than 99% of light having a wavelength of about 400 nm.

24. The composite of claim 15, further comprising transparent EMI shielding or a transparent antenna in or on the IR cutoff layer.

25. A composite, comprising:
a first film of polycarbonate ("PC");
a transparent infrared ("IR") cutoff layer disposed directly adjacent the first film of PC;
a first film of a resin composite disposed directly adjacent the transparent IR cutoff layer,
wherein the resin composite comprises a combination of a polymer selected from thermoplastic polyurethane ("TPU") or ethylene co-vinyl acetate ("EVA"), an ultraviolet ("UV") absorber, and a light absorber;
a first PC sheet disposed adjacent the first film of the resin composite;
a second film of the resin composite disposed adjacent the first PC sheet;
a second PC sheet disposed adjacent the second film of the resin composite;
a third film of the resin composite disposed adjacent the second PC sheet; and
a second film of PC disposed proximal the third film of the resin composite,
wherein the UV absorber comprises a combination of two or more UV absorbers, wherein a first UV absorber is selected from the group consisting of 2-(2H-benzotriazol-2-yl)-4,6-bis(1,1-dimethylpropyl)-phenol, phenol, 2-(5-chloro-2H-benzotriazol-2-yl)-6-(1,1-dimethylethyl)-4-methyl, and combinations thereof, and
wherein the TPU resin composite, comprising the combination of the TPU resin, the UV absorber, and the light absorber:
blocks greater than 99.9% of light having a wavelength of from 380 nm to 400 nm,
blocks greater than 99% of light having a wavelength of about 400 nm, or
blocks about 95% of light having a wavelength between about 380 and 410 nm.

26. The composite of claim 25, further comprising a low-E layer interposed between the third film of the resin composite and the second film of PC.

27. The composite of claim 25, further comprising a top coat on at least one of the first film of PC and the second film of PC.

28. The composite of claim 25, wherein the UV absorber comprises a combination of 2-(2H-benzotriazol-2-yl)-4,6-bis(1,1-dimethylpropyl)-phenol and phenol, 2-(5-chloro-2H-benzotriazol-2-yl)-6-(1,1-dimethylethyl)-4-methyl.

29. The composite of claim 25, further comprising transparent EMI shielding in or on the transparent IR cutoff layer.

30. The composite of claim 25, further comprising a transparent antenna in or on the IR cutoff layer.

31. A composite, comprising:
a first layer of glass;
a first layer of a resin composite disposed adjacent the first layer of glass, wherein the resin composite comprises a combination of a polymer selected from TPU or EVA, an ultraviolet ("UV") absorber, and a light absorber;
an IR cutoff layer disposed proximal the first layer of the resin composite;
a PET film disposed adjacent the IR cutoff layer;
a second layer of the resin composite disposed adjacent the PET film; and
a second layer of glass disposed proximal the second layer of the resin composite, and
wherein the UV absorber comprises a combination of two or more UV absorbers, wherein a first UV absorber is selected from the group consisting of 2-(2H-benzotriazol-2-yl)-4,6-bis(1,1-dimethylpropyl)-phenol, phenol, 2-(5-chloro-2H-benzotriazol-2-yl)-6-(1,1-dimethylethyl)-4-methyl, and combinations thereof, and
wherein the TPU resin composite, comprising the combination of the TPU resin, the UV absorber, and the light absorber,
blocks greater than 99.9% of light having a wavelength of from 380 nm to 400 nm,
blocks greater than 99% of light having a wavelength of about 400 nm, or
blocks about 95% of light having a wavelength between about 380 and 410 nm.

32. The composite of claim 31, further comprising:
a low-E layer interposed between the second layer of the resin composite and the second layer of glass; and
a third layer of the resin composite interposed between the low-E layer and the second layer of glass.

33. The composite of claim 31, wherein the UV absorber comprises a combination of 2-(2H-benzotriazol-2-yl)-4,6-bis(1,1-dimethylpropyl)-phenol and phenol, 2-(5-chloro-2H-benzotriazol-2-yl)-6-(1,1-dimethylethyl)-4-methyl.

34. The composite of claim 31, further comprising transparent EMI shielding in or on the IR cutoff layer.

35. The composite of claim 31, further comprising an invisible antenna in or on the IR cutoff layer.

36. The composite of claim 1, wherein the UV absorber comprises a combination of 2-(2H-benzotriazol-2-yl)-4,6-bis(1,1-dimethylpropyl)-phenol and phenol, 2-(5-chloro-2H-benzotriazol-2-yl)-6-(1,1-dimethylethyl)-4-methyl.

37. The composite of claim 12, wherein the UV absorber comprises a combination of 2-(2H-benzotriazol-2-yl)-4,6-bis(1,1-dimethylpropyl)-phenol and phenol, 2-(5-chloro-2H-benzotriazol-2-yl)-6-(1,1-dimethylethyl)-4-methyl.

* * * * *